United States Patent
Lei et al.

(10) Patent No.: US 12,503,132 B2
(45) Date of Patent: Dec. 23, 2025

(54) ADAPTIVE GUIDANCE FOR GROUP VEHICULAR TRAVEL

(71) Applicant: FORD GLOBAL TECHNOLOGIES, LLC, Dearborn, MI (US)

(72) Inventors: Oliver Lei, Windsor (CA); Vladyslav Slyusar, Northville, MI (US); Somak Datta Gupta, Novi, MI (US); Allen R. Murray, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 857 days.

(21) Appl. No.: 17/113,735

(22) Filed: Dec. 7, 2020

(65) Prior Publication Data

US 2022/0176986 A1  Jun. 9, 2022

(51) Int. Cl.
*B60W 60/00* (2020.01)
*B60W 40/09* (2012.01)
*H04W 4/44* (2018.01)
*H04W 4/46* (2018.01)

(52) U.S. Cl.
CPC .......... *B60W 60/001* (2020.02); *B60W 40/09* (2013.01); *H04W 4/44* (2018.02); *H04W 4/46* (2018.02); *B60W 2554/4046* (2020.02); *B60W 2555/60* (2020.02); *B60W 2556/65* (2020.02)

(58) Field of Classification Search
CPC ............... B60W 60/001; B60W 40/09; B60W 2554/4046; B60W 2555/60; B60W 2556/65; H04W 4/44; H04W 4/46
See application file for complete search history.

(56) References Cited

U.S. PATENT DOCUMENTS

| | | | |
|---|---|---|---|
| 9,884,622 B2* | 2/2018 | Dai | G08G 1/167 |
| 9,940,840 B1* | 4/2018 | Schubert | G06Q 30/06 |
| 10,037,699 B1* | 7/2018 | Toyoda | B60W 30/0956 |
| 10,353,387 B2* | 7/2019 | Stenneth | G05D 1/0027 |
| 10,482,767 B2* | 11/2019 | Miller, Jr. | B60W 30/165 |
| 11,113,960 B2* | 9/2021 | Felip Leon | G05D 1/0088 |
| 2018/0093668 A1* | 4/2018 | Kim | B60W 10/18 |
| 2018/0120861 A1* | 5/2018 | Saxena | G05D 1/0291 |
| 2019/0286133 A1* | 9/2019 | Bielby | B60W 50/085 |
| 2020/0012295 A1* | 1/2020 | Kim | G06Q 10/0631 |
| 2020/0042017 A1* | 2/2020 | Kelkar | G08G 1/22 |
| 2021/0056854 A1* | 2/2021 | Ucar | G05D 1/0295 |
| 2021/0172749 A1* | 6/2021 | Shin | G05D 1/0291 |
| 2021/0245759 A1* | 8/2021 | Yonemura | G08G 1/22 |

\* cited by examiner

Primary Examiner — Peter D Nolan
Assistant Examiner — Peter Y Ning
(74) Attorney, Agent, or Firm — Joseph Zane; Brooks Kushman P.C.

(57) ABSTRACT

A system determines at least one driving style, reflecting driving behavior for a driver of a vehicle and based on inputs from a plurality of vehicle systems. The system receives a plurality of wireless signals from elements within a wireless communication range, each signal indicating the behavior of one or more drivers of other vehicles within a predefined distance of the vehicle. Further, the system determines, based on the wireless signals, whether one or more drivers are exhibiting behavior comparable to the driver of the vehicle based on predefined comparison thresholds and, responsive to determining that one or more drivers are exhibiting comparable behavior, provides guidance as to how to maneuver the vehicle to reach the vehicles driven by the one or more drivers exhibiting comparable behavior.

11 Claims, 3 Drawing Sheets

ADAPTIVE GUIDANCE FOR GROUP VEHICULAR TRAVEL

TECHNICAL FIELD

The illustrative embodiments relate to methods and apparatuses for adaptive guidance for group vehicular travel.

BACKGROUND

Different drivers tend to have different driving styles, which means that at any given time, a single vehicle can be driving in a significantly different manner, e.g., braking, accelerating, etc., than the vehicles surrounding it. This may result from preferences of drivers, or from a person being in a hurry or being very cautious, but a vehicle acting differently than those around it can often make the driving experience difficult for other vehicles in the immediate vicinity.

Some drivers prefer aggressive driving behavior, and others may prefer cautious driving behavior. Weather, time of day, occupants (e.g., children), etc. may affect driving behavior, and many times people will try to match their instantaneous driving style to the apparent driving behavior of a group of vehicles with which they are traveling. The behavior is not always apparent, however, and such attempts may create stress on a driver who is forced to drive more or less aggressively than they would prefer.

SUMMARY

In a first illustrative embodiment, a system includes a processor configured to determine at least one driving style, reflecting driving behavior for a driver of a vehicle and based on inputs from a plurality of vehicle systems. The processor is also configured to receive a plurality of wireless signals from elements within a wireless communication range, each signal indicating the behavior of one or more drivers of other vehicles within a predefined distance of the vehicle. Further, the processor is configured to determine, based on the wireless signals, whether one or more drivers are exhibiting behavior comparable to the driver of the vehicle based on predefined comparison thresholds and responsive to determining that one or more drivers are exhibiting comparable behavior, provide guidance as to how to maneuver the vehicle to reach the vehicles driven by the one or more drivers exhibiting comparable behavior.

In a second illustrative embodiment, a system includes a processor configured to determine a preferred driving style, reflecting driving behavior for a driver of a vehicle and based on inputs from a plurality of vehicle systems including at least speed, braking and acceleration, reflecting speed-limit compliance, braking aggressiveness and acceleration aggressiveness, respectively, as components of the driving style. The processor is also configured to receive a plurality of wireless signals from elements within a wireless communication range, each signal indicating the behavior of one or more drivers of other vehicles within a predefined distance of the vehicle. Further, the processor is configured to determine, based on the wireless signals, whether one or more drivers are exhibiting behavior comparable to the driver of the vehicle based on predefined comparison thresholds and responsive to determining that one or more drivers are exhibiting comparable behavior, provide guidance as to how to maneuver the vehicle to reach the vehicles driven by the one or more drivers exhibiting comparable behavior.

In a third illustrative embodiment, a computer implemented method includes determining a preferred driving style, reflecting driving behavior for a driver of a vehicle and based on inputs from a plurality of vehicle systems including at least speed, braking and acceleration, reflecting speed-limit compliance, braking aggressiveness and acceleration aggressiveness, respectively, as components of the driving style. The method also includes receiving a plurality of wireless signals from elements within a wireless communication range, each signal indicating the behavior of one or more drivers of other vehicles within a predefined distance of the vehicle. Further, the method includes determining, based on the wireless signals, whether one or more drivers are exhibiting behavior comparable to the driver of the vehicle based on predefined comparison thresholds and responsive to determining that one or more drivers are exhibiting comparable behavior, providing guidance as to how to maneuver the vehicle to reach the vehicles driven by the one or more drivers exhibiting comparable behavior.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

While many drivers may adapt their driving style to an immediate group of surrounding vehicles, this may force people to drive in a manner in which they are not comfortable. Moreover, the actual driving style of a localized group may not always be readily apparent, and when a person tries to adapt they may not only over-correct, but they may also find themselves driving in a manner which makes them uncomfortable with the experience.

Autonomous vehicles may eventually solve this problem, if every vehicle on the road travels in the same, preprogrammed style, but autonomous vehicles will likely share the road with human drivers for a significant period of time. While autonomous vehicles may have a generally fixed style of driving, this style may not match a group in which the vehicle is traveling. Since an autonomous vehicle cannot become "uncomfortable" with a change in behavior, it would also be useful if the autonomous vehicle could match the localized group driving style, so it does not present an impediment. This would be a reasonable adaptation as long as the autonomous vehicle was not driving outside of any defined operating parameters.

In both the human and autonomous instances, the style of a group may not always be readily apparent. While the style might be observable if a driver drove with the same group for a long enough time, that is not always the case, and the faster that a group can act in concert the more comfortable the drivers in the group can become with the group style. Also, when a driver approaches a group of vehicles, the driver does not necessarily have many clues about how that group is driving.

The illustrative embodiments can model personal driving styles (instantaneous, historical, etc.) and use shared information to determine useful driving recommendations such as, but not limited to: identifying a group with similar styles, either in the immediate locality or within a predefined proximity, recommending a change in driving style to match that of a group, indicating the end of a group in case a driver wants to fall back from a group that is driving too aggressively, or indicating a nearby group driving more aggressively if a driver wants to break ranks with a group that is driving too cautiously, route planning based on predicted driving styles, etc. By providing modeled driver behavior and shared data, the illustrative embodiments allow for both faster adaptation to group behavior, and/or allow drivers to identify groups of similarly-styled drivers that may be nearby, but which are presently unknown to the driver.

Modeling a driving style can include a plurality of considerations. Illustrative considerations include, but are not limited to, inputs from a plurality of vehicle systems including at least speed, steering, braking and acceleration, reflecting speed-limit compliance, lane change frequency, braking aggressiveness and acceleration aggressiveness. For example, speed relative to a posted (and known from map data) speed limit can demonstrate how aggressively a driver tends to drive, and whether a driver prefers to cruise at, below or above the speed limit. Steering, which can be measured from steering wheel sensors and/or accelerometers, can indicate how aggressively someone changes lanes and passes. This can be useful to understand if someone has a style indicating a likelihood to make fast and unexpected lane changes. Whether or not the driver signals for lane changes can also be determined.

Accelerometers can also measure acceleration, braking, how aggressively a driver takes a banked or sharp turn and the general tendency of a vehicle to drift as it drives. Aggressiveness on deploying brakes or pressing the accelerator can be measured as a function of how far a respective pedal is depressed and how fast. All of this information, along with any other information indicative of driving style, can be used to build one or more profiles for a driver. Profiles may be defined under context, if a driver exhibits different behavior at different times, under different conditions, when the driver has passengers present, etc. An applicable context for determining a likely driving style for a driver can be determined based on a presently existing context, and if there is no exact match for context associated with a given profile, a closest-matching context can be chosen. If the observed immediate style does not match a projected style based on the closest matching context, but does match a different profile of behavior, the system may instead assume the now-matching profile is likely the one that will apply, and change a prediction about expected driving behavior for that driver.

With respect to the illustrative embodiments, various aspects thereof can be performed by processors, working alone or in combination, and working in conjunction with instructions stored on various memory mediums. The processors may be local to a vehicle, on a mobile device, cloud or infra-structure based, etc., as is appropriate for a given implementation of an embodiment. Storage mediums include any reasonable medium usable to store whole or partial instructions executable by processors, including at least various non-transitory storage mediums such as, but not limited to, hard disk drives, solid state drives, flash memory, etc. Communication between entities (e.g., without limitation, vehicles, the cloud, infrastructure, etc) may be facilitated by, for example, Wi-Fi communication, BLUETOOTH communication, cellular communication and other short and long range wireless communication.

Figure 1:
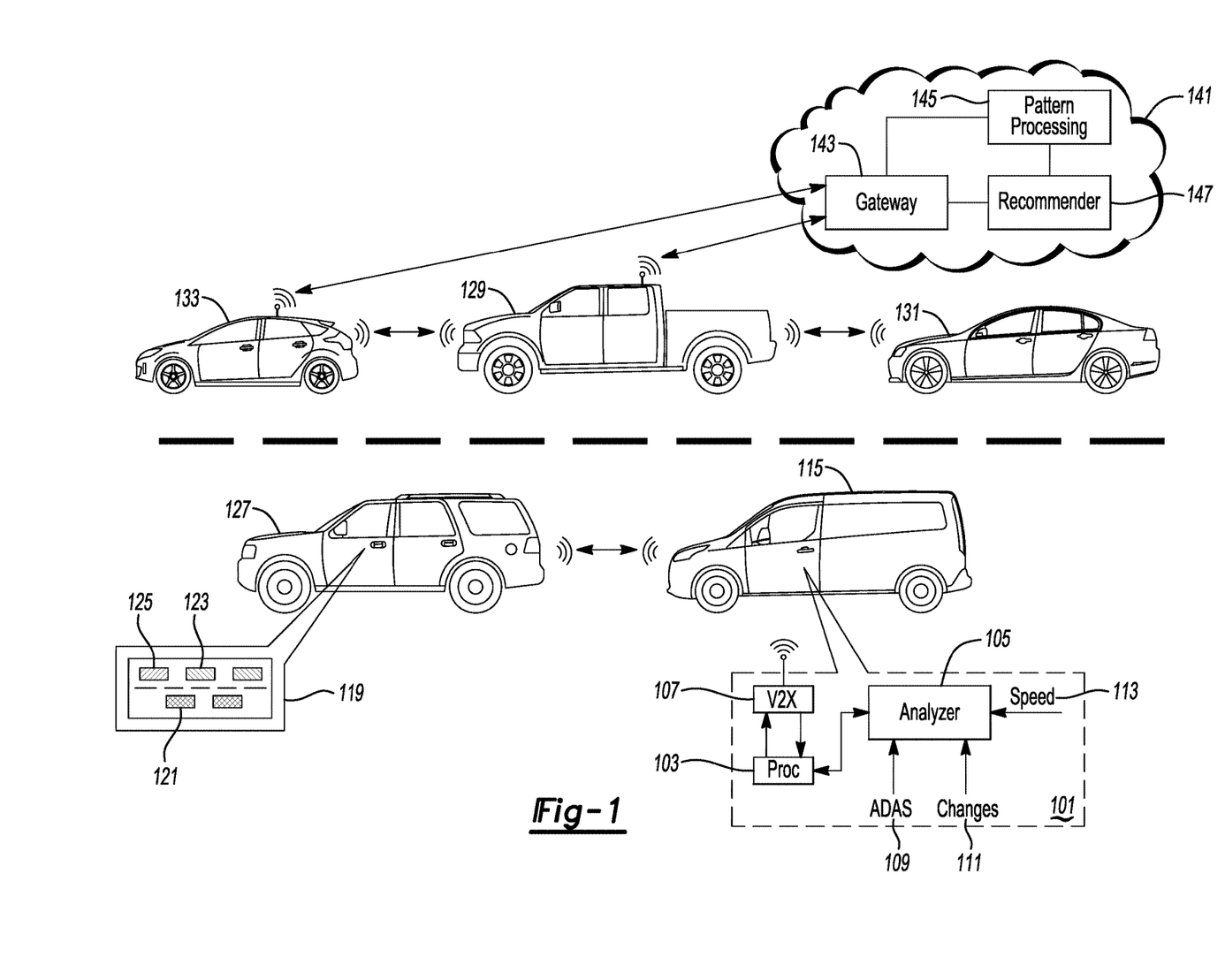
FIG. 1 shows an illustrative example of vehicles engaged in group driving and information sharing.

FIG. 1 shows an illustrative example of vehicles engaged in group driving and information sharing. This group of five vehicles 115, 127, 129, 131, 133 includes vehicles that may be traveling with different occupants and driving in different patterns. Without limiting the illustrative embodiments, an example will be given with respect to this figure to demonstrate how the various vehicles 115, 127, 129, 1313, 133 can share information that allows for drivers of a given one of the vehicles to make decisions about how that driver should be driving, moving or otherwise adapting to localized traffic behavior.

In this example, one or more of the vehicles, such as, for example, vehicle 115 may include onboard data gathering and profile analysis. An example of a vehicle computing system 101 includes an onboard processor 103 and a driving behavior analysis process 105. The analysis process receives inputs from various vehicle systems such as, but not limited to, advanced driver-assistance systems (ADAS) 109, speed changes (acceleration/deceleration) 111, speeds 113, etc. This data can be compiled in the analyzer to allow the vehicle 115 to self-determine a pattern associated with the current driver. These patterns may be compiled for a given drive, for a day, week, month, etc., as well as compiled under various driving conditions and associated with various road types. Accordingly, a driver profile may include, but is not limited to, current pattern, preferred pattern under current conditions, preferred pattern for given road type, preferred pattern for weather, preferred pattern for time of day, etc.

For example, a driver may drive casually to work and aggressively on the way home, except when there is precipitation or when the driver is traveling in a school zone. This sort of behavior can be known through analysis of historical data and this profile can travel with the driver as the driver changes vehicles. Changes to driver behavior over time (e.g., a driver has children and suddenly becomes more cautious) can be reflected in the modeling, and profiles can further weight more-recent behavior more heavily than older data, if desired.

In addition to knowing the driver's historic behavior, the analyzer can obtain present driving patterns (e.g., is the driver in a hurry or being very cautious). Instantaneous behavior may not always match historical patterns, and other drivers may derive more immediate benefit from knowing how the given driver is driving right now. This data can be shared via a communication system 107, generally referred to as vehicle to X communication (V2X), X can include, for example, vehicle (V2V), cloud (V2C), infrastructure, (V2I), etc. Suitable onboard communication devices and protocols can be used based on what type of communication is being shared (e.g., cellular or Wi-Fi to share to a cloud, in one example, and Wi-Fi or BLUETOOTH to share with a very proximate vehicle, for example).

Each of the vehicles 115, 127, 129, 131, 133, in FIG. 1 shows direct communication with at least one other vehicle, but it is appreciated that these vehicles 115, 127, 129, 1313, 133 may all be communicating with any other vehicle within range of a communication system and/or that may have relevant data or that may benefit from knowledge of the data transmitted from a given vehicle. Infrastructure units such as dedicated short-range communication units and the like may also serve as relays for communication between vehicles and may assist in information-sharing. Those units are also capable of relaying data up to the cloud, and they represent fixed source-points for observations about behavior in proximity to a given unit (as opposed to vehicles that move, which represent moving source points about behavior wherever the vehicle is instantaneously located).

The fixed source point model may be useful in some example, for example, in observing driving behavior over certain stretches of road if a driver is trying to obtain a route most-likely to meet a preferred driving behavior style. Since an instantaneous determination of how vehicles are immediately driving, when the route is calculated, at a remote location, is not always useful since the vehicle in question is not actually yet at the remote location, it may be more useful, or at least useful in general, to consider a longer-term snapshot of behavior in the vicinity of the remote location, and a DSRC transceiver can be a good source for receiving and monitoring such information.

Also, in this example, vehicle 127 includes an example of a vehicle HMI 119. The example HMI 119 shows the immediate grouping of vehicles along with coding for vehicles that are roughly exhibiting the same behavior. In this example, representations 121 (cross hatched) are vehicles 115 and 127, and they are driving in style 1. Representations 123 (forward slashed) are driving in style two and represent vehicles 129 and 131. Representation 125 (back slashed) is driving in style 3 and represents vehicle 133.

If, for example, vehicle 127 preferred style 2 or 3, that driver could move to travel more closely in concert with vehicles 129, 131 or 133, respectively. For example, if 133 was more aggressive, the driver of 127 could follow that vehicle 133 as it left the tighter group and travel in a smaller group with a more aggressive driver. Or if 129, 131 was moving more cautiously, the driver of 127 could slow down and change lanes to more cautiously travel with the vehicles exhibiting style 2.

By knowing, and in this case, showing, the present driving styles of the localized vehicles, the driver can make a fast, informed decision about whether the current group of vehicles is the preferred group, or whether the driver would be better suited with a different subset.

In this example, vehicles 129, 131 may be autonomous vehicles and may be traveling in a predetermined travel mode that is generally defined for autonomous vehicles. If the other vehicles 115, 127, 133 in the group were all traveling in, for example, style 1, then the autonomous vehicles 129, 131 could either fall back (or accelerate ahead) of the group or adapt their style to match that of the group. This can help avoid the autonomous vehicles presenting a non-accommodative impediment to travel.

Finally, in this example, a cloud-based system 141 can also assist in information sharing. This can help a driver with upcoming scenario changes (e.g., merging onto a highway, but not close enough to receive V2V communication) and/or advanced planning, such as routing. In the former example, a driver may be a fairly cautious and slow driver and may benefit from some advance warning if approaching a highway where a number of fairly aggressive drivers are driving, or vice-versa. The example system 141 is a limited one, but is only representative to give a sense of the sorts of functionality that could be provided to a cloud-based system, which would also include any onboard functionality as reasonable (e.g., profile modeling, recommendation systems, group modeling, etc.).

In this example, the system includes a gateway module 143 that handles receipt and transmission of communication from the cloud system 141. This can include receiving immediate modeling data from vehicles, local data from DSRC or C-V2X transceivers, etc. The gateway 143 may also send map-data responses, recommendations, alerts, etc. Here, the system 141 receives data from individual vehicles 133 and can pass that on to a pattern recognition process, which can model the behavior and/or match a driver's current pattern profile to those of other local vehicles. If there is a "better" group of vehicles with which the driver could be traveling, for example, a recommendation process 145 may send back a recommendation to a vehicle 129 that recommends a shift in location.

For example, localized vehicle data for vehicles may demonstrate, for example, that vehicle 133 does not match the behavior of any immediately local vehicles 115, 127, 129, 131. While the driver may not want to drive with this group, the driver (who in this example will be considered more aggressive) may not also want to speed alone along a highway, since there is less likelihood of getting pulled over when traveling with a group of speeders. The cloud 141 could be aware of another group of style 3 drivers only two miles ahead, which is well outside short-range communication range, but also easily reachable by the driver of vehicle 133.

Since the group is outside short range communication, the driver of vehicle 133 would likely never know of the group of vehicles ahead, but the cloud 141 could match the driver's style 3 to that of the leading group and inform the driver of vehicle 133 that the driver could find a group of similarly driving vehicles 1.8 miles ahead on the current road. Then the driver of vehicle 133 could decide if it was reasonable to travel forwards from the present group to the new one. If the driver did not want to travel, the system (local or cloud) could also recommend a behavior match, which in this case might be style 1, and when the driver of 133 matches style 1, that could cause vehicles 129, 131 (autonomous) to then also match the group, bringing the whole group into concert on a single style with minimal effort.

Figure 2:
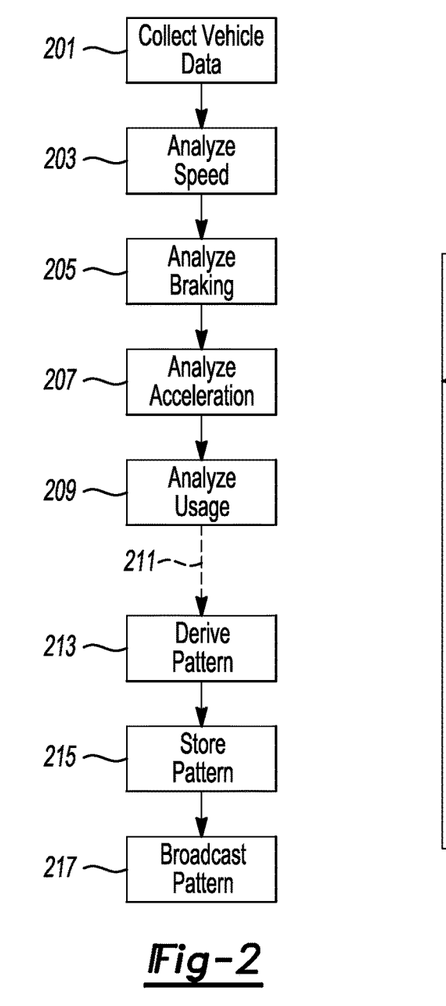
FIG. 2 shows an illustrative example of a driver profiling process.

FIG. 2 shows an illustrative example of a driver profiling process. In this example, an onboard process 105 analyzes the driver's behavior to create a current profile and update a historic profile, if desired. Since a person may drive outside of normal behavior for any given reason (e.g., aggressive because they are late, cautious because they have a fragile load, etc.), it may be useful to model both a drive-profile (current drive) as well as historical profiles. For example, a person driving to a home-goods store may drive normally, and then very cautiously on the way home if they have a trunkful of glassware. Using a historical profile only would not necessarily reveal current behavior, as it would not match expected behavior. While the process executes in a vehicle processor 103 in this example, it could also execute on a mobile device in communication with the vehicle 115, or, for example, in the cloud 141.

In this example, the process 105 begins to collect vehicle data at 201, when a drive begins. The process may collect data at certain intervals, and may increase or decrease the timing of those intervals based on changes in conditions, road-types, etc. For example, if a person was driving 10 miles on a single road, data at 15 or 30 second intervals might be sufficient to model their behavior on that road, but if they merged onto a highway, data may need to be collected more quickly, at least temporally proximate to the road type change. So, for example, any time a person enters a new road, new road type, new weather condition, etc., the data collection may accelerate until a baseline model is established based off of a number of data points or a consistency-of-data, and then the collection interval may drop off as desired.

In this example, various illustrative inputs used as consideration are disclosed, but it is appreciated that those inputs may vary situationally and can extend beyond those used for purposes of example. Here, for example, speed is analyzed at 203. In this example, braking and acceleration are analyzed separately at 205 and 207, respectively, so speed in this sense means actual vehicle speed. For example, without limitation, how closely to the speed limit is the driver driving.

Speed alone is often a valuable data point, as some people may travel exactly at the speed limit, some 5 miles over and some 10 miles over. While there are many variations of preferred travel speed relative to the limit, the preceding are easy for a driver to calculate and so they are likely frequently used by drivers as basis for how much a driver is willing to exceed a limit.

On a 25 mile per hour road, a vehicle traveling at 35 miles per hour is going 40 percent faster than traffic traveling the speed limit, so this can represent a significant variable. That driver would also probably prefer to travel with others doing the same, to diminish the chances of being singled out. At the same time, if most vehicles are traveling at 35 miles per hour, a vehicle traveling at 25 miles per hour represents a significant impediment to those vehicles, and a driver of that vehicle may prefer to drive with others who are also traveling the speed limit, to avoid being constantly passed or tail-gated.

The process 105 can also analyze speed variance, which is how much change is represented in speed over the route when not encountering forced stops. That is, does the driver drive 30 miles per hour constantly, or are they constantly varying between 25 and 35. Drivers who drive a fixed speed (often with cruise control) may want to travel with other similar drivers, even if the fixed speed is a little above or below their preference, so they can simply set their cruise control and not have to constantly brake or accelerate and reset their cruise control. These are just several examples of speed-based behavior that can make driving in a similarly-behaving group more desirable for a driver.

Also, in this example, the process 105 analyzes braking at 205. This analysis can consider, for example, hard braking, delayed braking, constant braking, etc. Since braking disrupts the travel of vehicles behind a vehicle, certain drivers may not want to travel in a group or formation with someone who brakes at the last minute or aggressively. Other drivers may not want to travel with someone who begins braking well ahead of a planned stop, and so again, braking profiles can serve to line up drivers with similar preferences.

The process 105 additionally analyzes acceleration at 207, in this example. This can include duration of acceleration, burst acceleration, etc. Acceleration is often a useful measure of driving aggressiveness, and cautious drivers may not want to travel with drivers who frequently accelerate to, for example, change lanes through tight corridors between vehicles. Similarly, aggressive drivers may not want to travel with cautious drivers who do not take advantage of passing opportunities and may frustrate a driver who wants to travel in front of, or beyond, a group. Frequency of lane change and lane traveling tendencies can also be contemplated, as can other reasonable variables that tend to indicate how an individual drives.

The process 105 further, in this example, analyzes ADAS usage at 209. ADAS can be an indicator of whether the vehicle has advanced safety and assistance engaged and utilized. It can also be a measure of feature usage like cruise control, for example, and can indicate if a given driver tends to let the vehicle cruise at a fixed speed, which may be more or less desirable for other drivers based on their own patterns. The types of ADAS (e.g., without limitation, adaptive cruise control, anti-lock braking, heads-up displays, night vision, collision alert and avoidance, drowsiness detection, stability controls, lane centering and departure warning, rain sensors, traction control, etc.) may also factor into profile usage.

In some instances, where a driver can tune their preferred group driving preferences, drivers may opt into driving with a group that heavily uses ADAS systems, which often improve safety and could be desirable even if a given individual does not have access to them on their personal vehicle. In instances where a driver tunes the preferences, recommendations that may otherwise be keyed to finding drivers of similar driving style may instead be keyed to finding drivers of the preferred preferences.

Tuning also allows a driver who may be driving aggressively, for example, but who would prefer to drive cautiously in a group, find an appropriate group without recommendations being over-biased based on the current aggressive driving. In instances where the system utilizes or weighs-in driver preferences (which can be explicitly indicated or derived from historic, as opposed to present, behavior), recommendations may vary from simple matching recommendations (where the current behavior is matched) to recommendations that accommodate the preferences in an explicit or weighted manner. Preferences and historic behavior can also provide fallback recommendations, in instances where a present match for current behavior cannot be found. Which are the primary considerations and which are the fallback considerations is a matter of reasonable choice when developing various embodiments and can also itself be specified by a vehicle manufacturer or occupant.

At 211 the process 105 may consider additional factors that reasonably factor into profiling a driver, and at 213 the process 105 derives a driving pattern or patterns. The process may drive an instantaneous driving pattern, e.g., without limitation, the current pattern on the current road under the current conditions. The process may also derive updated historic patterns that weigh in current behavior, which can be equal-weight or time-weighted, where more-recent data weighs more heavily. The process can also discard or under-weight aberrant behavior that deviates from a standardly observed behavior, as well as note the under-weighting and/or discarding that preserves the data in a manner that can re-weight or recapture the data if a prolonged period of data measurement indicates that this data was actually indicative of new driving preferences (e.g., a cautious teen who is becoming comfortable with driving turning into a more aggressive driver).

The process 105 can further derive context-based patterns, that incorporate, for example, time of day, type of weather, road type, road speed, etc. By having a set of patterns-in-context, if desired, the process 105 may be better able to make recommendations under current context, whether the context is where the driver is currently located or where the driver will be at some point along a route (e.g., if the driver travels into or out of weather, or onto a highway, the observed context-based preferences can recommend routes or groups with which to travel based on context expected or observed at the future locations).

The process 105 may store any and all derived patterns or updated patterns in a local memory at 215, and/or upload those patterns to the cloud 141 if desired. Also, as previously noted, this process 105 can execute on a device connected to the vehicle, or in the cloud 141 itself. Versions of this process 105 may also execute at various C-V2X or DSRC transceiver locations or other infrastructure units, which may derive patterns for a locality of the unit (e.g., transmission range) as opposed to deriving patterns for a given vehicle. That information may be useful in both routing and recommendation decisions, and may also provide additional information that can be inferred about instances of conditions, such as traffic, local authority presence, construction or road impediments, etc. The inferences may be determined by examining how patterns at many locations tend to change when one of the instances is noted, and when a similar pattern develops proximate to a C-V2X or DSRC transceiver, the occurrence of one of the corresponding instances may be inferred.

Finally, in this example, the process 105 broadcasts the pattern(s) at 217. This can include, for example, a V2V broadcast, a V2I broadcast, a V2C broadcast or transmission, etc. The pattern broadcast may be persistent or intermittent, and will be useful for other vehicles and vehicle-related processes to determine the driving pattern of a given vehicle, when making recommendations to the driver of the other vehicle.

Figure 3:
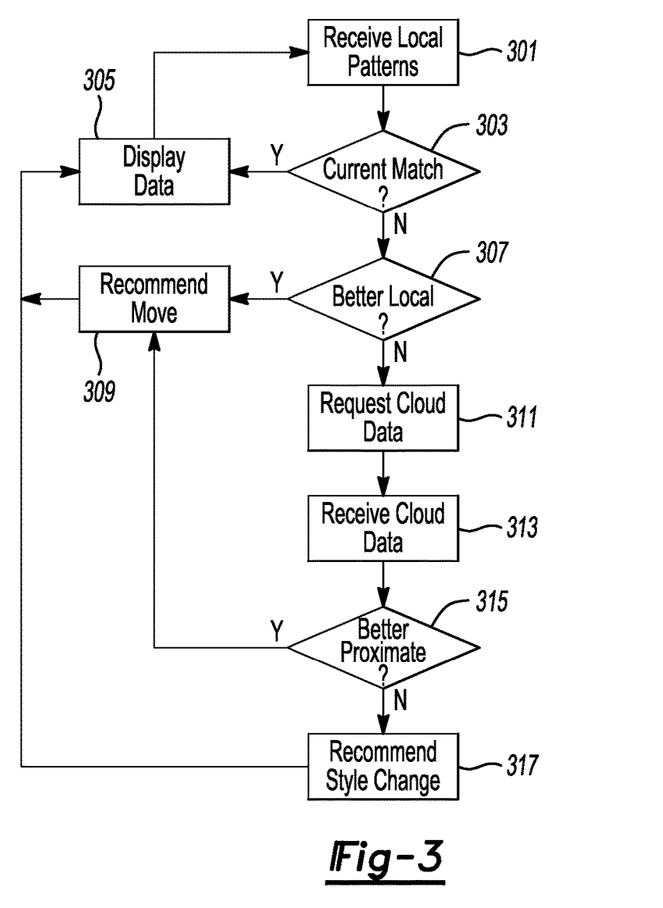
FIG. 3 shows an illustrative example of a recommendation process.

FIG. 3 shows an illustrative example of a recommendation process. In this example, a recommendation process, executing on, for example, a vehicle, in the cloud, a mobile device, etc., receives local driver behavior patterns at 301. This example is given with respect to data that is both local and proximate, and for the purpose of this example, local with be within a first predefined distance and proximate will be within a second predefined distance that is greater than the first predefined distance.

In instances where a number of vehicles drive within wireless communication range of at least one of the other vehicles, then an ad-hoc network between vehicles may serve to relay information, even if an object vehicle (the vehicle receiving the recommendation) is not within communication range of a group that is a match for behavior. In other instances, C-V2X or DSRC transceivers and infrastructure units can fill in "gaps" in the network, as well as provide data about vehicles outside of communication range (the C-V2X or DSRC transceivers may be themselves in a wireless or wired network with each other, as well as other vehicles). In still other instances, longer-range communication (e.g., cellular) may provide the data.

In this instance, the process handles data relating to certain vehicles within 0.25 miles at 301, although that number is chosen for example purposes only. While the process could handle data relating to all vehicles, in this example, the process only receives data about vehicles that are on the same road, or on a reachable road, or are on a road along a known route, etc. Essentially, the process handles the data relating to vehicles with which the driver of the object vehicle could travel. The process may receive additional data, which may include indications of where the other vehicles are located, and may discard data that is not pertinent to the considerations for the object vehicle. This sorting can also be done at the cloud 141 level as well, which may occur, for example, when the data is directly transmitted to the object vehicle from the cloud.

In this example, if the process detects a pattern match at 303 with immediately adjacent or very nearby vehicles, the process may display data about matching vehicles at 305. For closer vehicles, for example, this can be in the form of a heads up display and may show individual vehicles if there are sufficiently few vehicles that a display remains comprehensible. In other instances, the process may show clusters representing behavior, and indicate if the driver is in a cluster of similarly-behaving vehicles. In still other instances, text-based or other visual information may be displayed, indicating where the driver is relative to similarly-behaving vehicles.

In this example, if there is no match within, for example, 25-50 feet, then the process may determine if there is a better local match at 307. Matching does not necessarily require the exact same behavior, but the process and profiling may classify drivers as, for example, cautious/standard/aggressive or in other tiers, and the process may contemplate a match based on whether or not the driver of the object vehicle fits within a classification of a given category, which may include ranges of variables contemplated to loosely define behavior as being quantifiable as the type associated with the given category.

If there is a better local match, in this example defined as 0.25 miles, then the process may recommend a move or show the availability of the match at 309. The process may isolate matches to those that are on a current road or otherwise reasonable for the object vehicle driver to travel to, and may further, in some instances, only show matches if a threshold number of additional vehicles are present (e.g., 2+, 3+, etc.). If there is not a better local match, and if the driver is not currently traveling with matching vehicles, then the process may request data from the cloud at 311 (or from an infrastructure network, for example).

Upon receiving the cloud data at 313, the process may determine if there is a better match in a wider proximity, in this example 1.5 miles. Again, constraints on accessibility may be applied by the process, and the driver can then be informed of and recommended to move to the better matching group at 309.

As an alternative to moving the driver's vehicle, in this example, the process may recommend a driving style change at 317. This can help the driver more closely match the style of local vehicles, for example, especially adjacently local vehicles, and may be presented in the form of speed, braking, acceleration, etc. recommendations, or may be a recommendation such as a recommendation to drive more aggressively or cautiously to match adjacent drivers. In systems with certain ADAS equipped, features like adaptive cruise control could also be offered that would allow the vehicle to somewhat automatically adapt to the localized driving styles.

Figure 4:
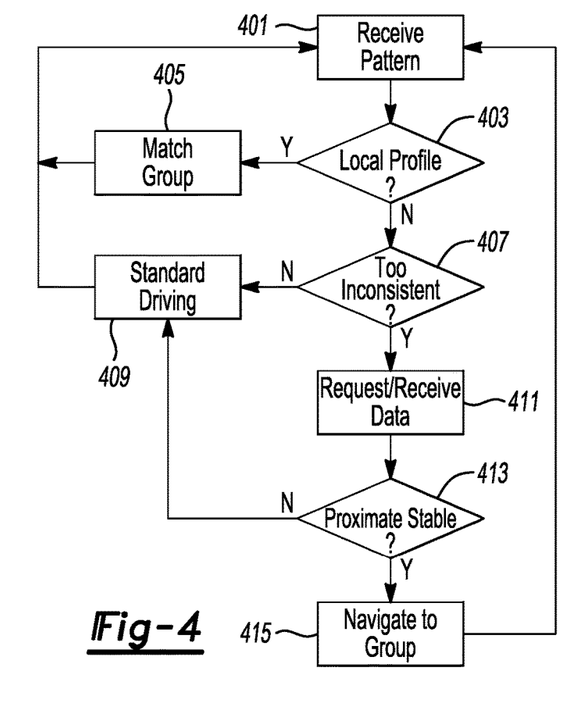
FIG. 4 shows an illustrative example of an autonomous vehicle adaptation process.

FIG. 4 shows an illustrative example of an autonomous vehicle adaptation process. Autonomous vehicles could adapt in manners similarly to previously described with respect to FIG. 3, where automatic controls would, for example, occur when a given recommendation would have been present for a human driver. In this example shown in FIG. 4, another, not dissimilar, style of illustrative adaptation is presented.

As with the human driven vehicles, the process in FIG. 4 receives some pattern data about vehicles in the immediate vicinity of, or within a locality of, the autonomous vehicle (AV) at 401. Autonomous vehicles may have a default driving pattern, but also may be capable of fast adaptation to a local pattern, so in this example the process first determines at 403 if there is data available about a localized group of vehicles defining localized profile, e.g., are the immediately adjacent vehicles all or mostly driving in a similar style. Thus, if the AV is already in a group of similarly styled drivers, even if the style does not match an AV default style, the AV may simply change its own behavior at 405 to mirror that of the group.

If there is not a discernable localized profile at 403, this may be because the local data reflects inconsistent behavior at 407. If there is localized behavior, but not behavior that the AV would normally match, for example, if a passenger of the AV has indicated that the AV should not drive in a manner preferred by the local group (e.g., the passenger requests "cautious only" or "aggressive only" type driving), of, for example, if the current profile is unsuitable for AV driving based on minimal safety requirements, then the AV can engage in "standard" AV driving at 409, using a defined baseline style profile.

If the behavior is within tolerance bounds based on settings or standards, but is too inconsistent for the AV to choose a behavior to match (e.g., a group of aggressive and cautious drivers, but no definable cluster for the AV to match, or the passenger only wants "standard" matching, then the AV can request and receive data for a larger proximity at 411.

Once the process receives the data at 411, the process can determine whether there is a stable group of vehicles in the larger proximity at 413. The decision that the group is stable and suitable may also be a function of passenger preferences and minimum constraints, and may further be determined based on accessibility, as with the human-driven vehicles in FIG. 3. If there is no such discernable group, the AV can remain in or default to standard driving modes at 409. Otherwise, the AV may accelerate, decelerate, change lanes, change routes, etc. at 415 to navigate to join the group of vehicles with which the data indicates it should be or could be traveling.

Such changes may be easier for an AV to accommodate, both on the group-joining and adaptation fronts, since an AV technically lacks a "preferred" style of driving and should include software and control systems that make it easier for an AV to do things a human might be uncomfortable doing. From the perspective of human drivers in a given group which the AV joins, the joining of the AV will serve to reinforce the group behavior model, as it will match the group behavior, and since it should be able to accommodate a given style, there should be minimal impact to the group at large. This may also serve to move the AV out of a group it cannot or will not accommodate, which then would work to the benefit of both groups (the joined-group and the left-group).

Additionally or alternatively, an AV may serve as a guide for a group of humans. The AV may be capable of carefully matching behavior to a given environment, and thus may serve as a good benchmark for other drivers. So, in this example, a human-driven vehicle may see an indicator of an AV in a group and match to, or be recommended to match to, the behavior of the AV. While this would work in a variety of environmental conditions, in low-visibility conditions (heavy rain, fog, etc.) AV sensors may have a much better grasp of the road and surrounding environment, and thus may be a better gauge of safe driving than human counterparts.

In such an instance, the AV may advertise, as part of its signal, that it is driving in a recommended mode for a given environment or situation, and users in other vehicles detecting such a signal may be presented with an option to match the AV style. This can be achieved through automatic control and guidance or instructional guidance, and the user may be presented with one or both options in terms of whether to maneuver to a group of similar vehicles and/or whether to match an AV exhibiting "model" behavior.

Figure 5:
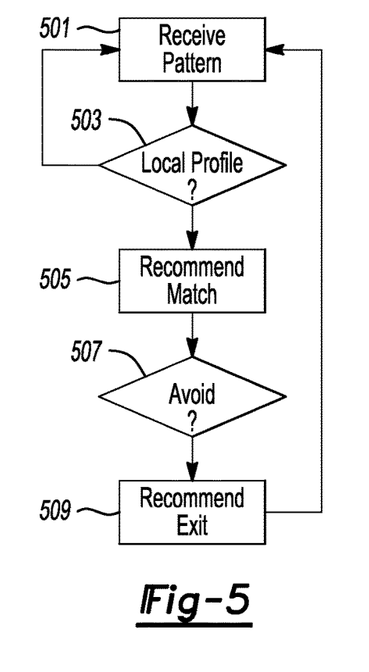
FIG. 5 shows an illustrative example of a group-response process.

FIG. 5 shows an illustrative example of a group-response process. In this example, a recommendation process determines if a driver should match the behavior of surrounding vehicles, if the driver wants an experience more accommodative of those other vehicles' style. The object vehicle process receives a pattern at 501, which is the behavior patterns of one or more vehicles in some immediate vicinity (e.g., 50 yards) of the object vehicle. If this pattern defines a local profile at 503, the process will determine if the driver should match the profile. If the pattern data does not define a localized profile (e.g., a mix of styles with no clear winner), the process may simply continue to receive data and let the driver make the driver's own decisions without recommendation.

If the process determines that the driver might match a local style, the process may contemplate, for example, driver preferences, vehicle capabilities, ADAS onboard, etc., to determine if a match is predefined as unsuitable (e.g., preferences) or is not possible (e.g., capabilities). The process may note the capability for a match at 505, or in some instances default to an auto-avoid mode at 507, especially if the vehicle is incapable of matching the behavior (e.g., a low power vehicle trying to stay with a group of aggressively speeding vehicles).

If the match is accepted by the driver (which can be a literal acceptance or just a change in behavior), the process continues to gather data at 501 in case further changes occur. Otherwise, the process may recommend an avoidance pattern at 509, which can include speeding ahead of the group, changing a lane, slowing down or, in some instances, changing a route or road on which the vehicle is traveling.

Figure 6:
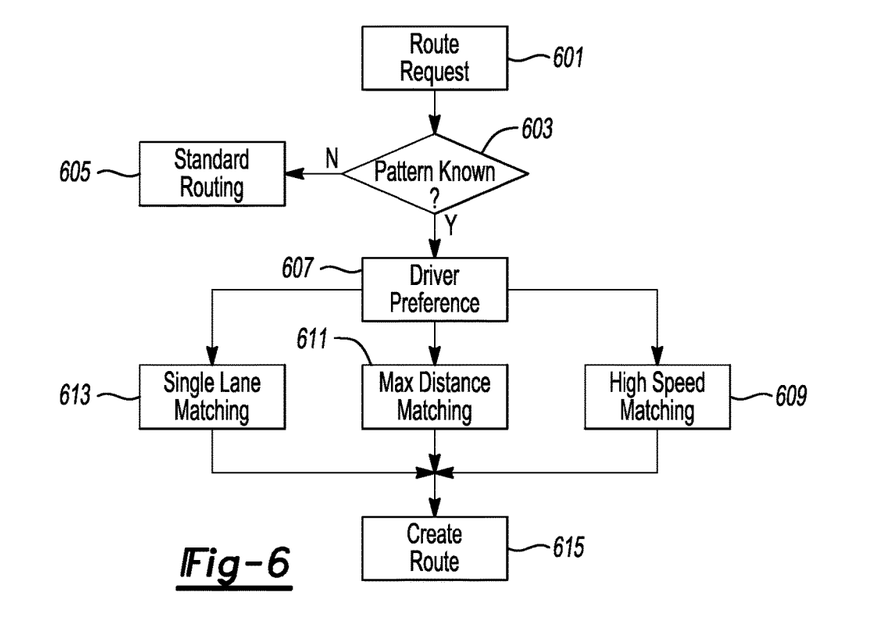
FIG. 6 shows an illustrative example of a route-planning process.

FIG. 6 shows an illustrative example of a route-planning process. This is an illustrative example of how driver behavior can be used to plan routes, if desired. This is also an instance where localized behavior determined by C-V2X or DSRC transceivers or other infrastructure elements may be useful. This routing process can be run onboard or in the cloud 141, and if it is run onboard, it will typically receive information from the cloud as to behavior patterns occurring, or projected to occur, on roads not within a short-range wireless transmission range. For example, if the driver lives near a busy street, a small amount of localized data might be receivable by the vehicle, but otherwise the vehicle would obtain all additional data from the cloud.

Current behavior patterns of individual drivers who are not immediately going to be on the vehicle's projected path are marginal in utility here, as the object vehicle will be unlikely to encounter those vehicles. Those patterns might reveal an instance of an incident, however, and so they still may be contemplated for that or other reasonable uses. For example, unexpected deviances in behavior at a point along a planned route (e.g., aggressive slowing, swerving, etc.) may indicate the presence of an impediment, which can inform route planning.

In this example, the driver inputs a routing request at 601, and the process determines if a pattern is known for that driver at 603. The pattern can be a typical historical pattern for that driver or a typical historical pattern under context, or may have been established previously on a drive where the routing request is not received at the onset. If there is no projected or known pattern at 603, standard routing occurs at 605.

If there is a projected or known pattern, the process may also contemplate a driver preference at 607, shown here as three illustrative branches. In this example, the driver has a variety of characterizable behavior patterns, such as how the driver drives on high-speed roads, how the driver generally drives on all roads, how the driver drives under weather, at times of day, etc.

Since it will be likely, especially when projecting behavior, that only certain aspects of the driver preferences can be initially projected to be matched, the routing engine may perform matching based on ordered preferences. For example, a driver may always want to start the morning with a casual drive, and so may not care about pattern matching on a local road, but by the time the driver reaches a highway, the driver is fully awake and wants to drive aggressively. This driver may elect to have the pattern matching attempt to find likely pattern matches on high-speed roads that comprise the route at 609.

For example, a route may have two possible high-speed road access points and travel durations, representing different highways traversable to a work destination. A first of these roads may have historical or instantaneous data indicating that everyone usually travels or is traveling cautiously. A second of these roads may indicate that a number of drivers are driving aggressively, or are projected to be driving aggressively. Even if the route took a little longer, the driver may prefer the aggressive driving profiles, feeling safer and more in control on that route, and so the routing process could present that route based on projected behavior of drivers (as a group, at least) when the driver of the object vehicle arrives. As the route progresses, the routing engine can re-evaluate the decision making, and can also make smaller, more localized decisions about behavior matching, while generally adhering to the planned route that will serve the driver's preference for traveling with aggressive traffic on the highway.

In a second preference, the driver may prefer to spend the maximum amount of time on a route traveling with traffic that matches or is projected to match the driver's own behavior at 611. This decision can contemplate behavior under context (e.g., cautious in neighborhoods, aggressive on highways, etc.) and can attempt to align the route to roads and regions where others historically (and/or currently) match the driver's observed or preferred behavior for a given road.

Again, the routing engine may dynamically recalculate the route as the driver travels, and, for example, if on a given day the driver is even driving aggressively on surface roads, which may be aberrant behavior for that driver, the process can adapt the route to keep the driver in surface road traffic that is and is projected to drive aggressively as well.

In a third preference, the driver may want to maximize matching behavior on single-lane roads at 613, where passing may not be possible. The driver may drive aggressively and want to ensure that any non-passing scenarios are likely to include aggressive traffic, as much as is predictable. The driver may not care as much about highway travel, where the driver can pass people if desired, and so the route may elect any necessary single lane surface roads that have high likelihood of aggressive driving (e.g., a road marked 35 mph, but where everyone drives 50 mph, because of low police presence and lack of domiciles and businesses).

The preferences can also be accommodated in an order, with focus on the most highly ranked preference but then secondary considerations as with regards to the other preference(s). So, in the first example above with high speed travel as the primary preference, once the main route had been established (e.g., the primary highway had been chosen), the system may then try to max out matching as much as possible (611) or max out matching on single lane roads (613) or do one of those then the other.

Finally, the process derives and presents a route. The route can be subject to other constraints, such as maximum travel time, maximum travel time delta from a fastest route, minimum distance, maximum delta from a shortest route, avoiding traffic, etc. Whether these considerations are done before, during or after the behavior-based planning is simply a matter of preference, and which order the considerations are processed may produce different, but understandable, results.

The illustrative embodiments provide an opportunity for improved vehicle recommendations to drivers, both in routing and instantaneous behavior, and improved ability of autonomous vehicles to drive in accordance with other vehicles, all of which can serve to create a more pleasing and less frustrating driving experience.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
a processor configured to:
determine at least one driving style, reflecting predefined driving behavior for a computerized driving system of a vehicle and based on inputs from a plurality of vehicle systems;
receive a plurality of wireless signals from elements within a wireless communication range, each signal indicating the behavior of one or more drivers of other vehicles within a predefined distance of the vehicle;
determine, based on the wireless signals, whether one or more drivers are exhibiting behavior comparable to the computerized driving system of the vehicle based on predefined comparison thresholds; and responsive to determining that one or more drivers are exhibiting comparable behavior, provide guidance as to how to maneuver the vehicle to reach the vehicles driven by the one or more drivers exhibiting comparable behavior.

2. The system of claim 1, wherein the processor is configured to present the guidance as navigation instructions for the computer to drive to the vehicles driven by the one or more drivers exhibiting comparable behavior.

3. The system of claim 1, wherein the processor further configured to:

responsive to determining that too few drivers are exhibiting comparable behavior, provide guidance as maneuvering instructions for the computerized driving system to match the behavior within a predefined tolerance, of a group of a plurality of the drivers of other vehicles all exhibiting behavior comparable to each other determined based on the predefined comparison thresholds.

4. A system comprising:

processor configured to:

determine a preferred driving style, reflecting predefined driving behavior for a computerized driving system of a vehicle and based on inputs from a plurality of vehicle systems;

receive a plurality of wireless signals from elements within a wireless communication range, each signal indicating the behavior of one or more drivers of other vehicles within a predefined distance of the vehicle;

determine, based on the wireless signals, whether one or more drivers are exhibiting behavior comparable to the computerized driving system of the vehicle based on predefined comparison thresholds; and responsive to determining that one or more drivers are exhibiting comparable behavior, provide guidance as to how to maneuver the vehicle to reach the vehicles driven by the one or more drivers exhibiting comparable behavior.

5. The system of claim 4, wherein the processor is configured to present the guidance as navigation instructions for the computer to drive to the vehicles driven by the one or more drivers exhibiting comparable behavior.

6. The system of claim 4, wherein the processor is further configured to:

responsive to determining that too few drivers are exhibiting comparable behavior, provide guidance as maneuvering instructions for the computerized driving system to match the behavior, within a predefined tolerance, of a group of a plurality of the drivers of other vehicles all exhibiting behavior comparable to each other, determined based on the predefined comparison thresholds, the maneuvering instructions including changing at least one of speed, braking and acceleration, reflecting speed-limit compliance, braking aggressiveness and acceleration aggressiveness.

7. A computer implemented method comprising:

determining a preferred driving style, reflecting a predefined driving behavior for a computerized driving system of a vehicle and based on inputs from a plurality of vehicle systems;

receiving a plurality of wireless signals from elements within a wireless communication range, each signal indicating the behavior of one or more drivers of other vehicles within a predefined distance of the vehicle;

determining, based on the wireless signals, whether one or more drivers are exhibiting behavior comparable to the computerized driving system of the vehicle based on predefined comparison thresholds; and responsive to determining that one or more drivers are exhibiting comparable behavior, providing guidance as to how to maneuver the vehicle to reach the vehicles driven by the one or more drivers exhibiting comparable behavior.

8. The method of claim 7, wherein the other elements include the other vehicles.

9. The method of claim 7, wherein the other elements include infrastructure elements indicating behavior of vehicles in communication with the infrastructure elements.

10. The method of claim 7, further comprising, responsive to determining that too few drivers are exhibiting comparable behavior, expanding the predefined distance.

11. The method of claim 10, wherein, responsive to the predefined distance being expanded beyond the wireless communication range, one or more additional wireless signals are received from a cloud-based element, indicating behavior of one or more drivers reported to the cloud-based element from vehicles within the predefined distance.

* * * * *